United States Patent
Kiontke

(10) Patent No.: US 9,551,571 B2
(45) Date of Patent: Jan. 24, 2017

(54) METHOD AND DEVICE FOR MEASURING A DECENTRATION AND TILT OF FACES OF AN OPTICAL ELEMENT

(71) Applicant: asphericon GmbH, Jena (DE)

(72) Inventor: Sven Kiontke, Jena (DE)

(73) Assignee: Asphericon GmbH, Jena (DE)

( * ) Notice: Subject to any disclaimer, the term of this patent is extended or adjusted under 35 U.S.C. 154(b) by 0 days.

(21) Appl. No.: 14/707,703

(22) Filed: May 8, 2015

(65) Prior Publication Data

US 2015/0323416 A1   Nov. 12, 2015

(30) Foreign Application Priority Data

May 8, 2014 (DE) .................. 10 2014 208 636

(51) Int. Cl.
| | |
|---|---|
| *G01B 9/00* | (2006.01) |
| *G01B 11/25* | (2006.01) |
| *G01B 11/27* | (2006.01) |
| *G01M 11/02* | (2006.01) |
| *G01B 11/24* | (2006.01) |

(52) U.S. Cl.
CPC .......... *G01B 11/25* (2013.01); *G01B 11/2441* (2013.01); *G01B 11/27* (2013.01); *G01M 11/0221* (2013.01); *G01M 11/0271* (2013.01)

(58) Field of Classification Search
CPC ............ G01M 11/025; G01M 11/0221; G01M 11/0271; G01B 11/27; G01B 11/255; G02C 7/063; G02C 2202/04
USPC .................................................. 356/124–127
See application file for complete search history.

(56) References Cited

U.S. PATENT DOCUMENTS

| | | | |
|---|---|---|---|
| 5,548,396 A * | 8/1996 | Morita ............... | G01M 11/0221 356/127 |
| 5,844,670 A * | 12/1998 | Morita ................ | G01B 11/255 356/124 |
| 6,392,754 B1 | 5/2002 | Pingel et al. | |
| 7,535,557 B2 * | 5/2009 | Wu ...................... | G01B 11/272 356/127 |

(Continued)

FOREIGN PATENT DOCUMENTS

| | | |
|---|---|---|
| DE | 196 43 018 A1 | 4/1998 |
| DE | 10 2006 052 047 A1 | 5/2008 |

(Continued)

*Primary Examiner* — Hoa Pham
(74) *Attorney, Agent, or Firm* — Muncy, Geissler, Olds & Lowe, P.C.

(57) ABSTRACT

A method and device for measuring a decentration and tilt of faces of an optical element is provided. At least all optically used and frame-relevant partial surfaces of a surface of the optical element and reference faces of the optical element are registered over the whole area thereof and referenced to one another in a common coordinate system, wherein in each case a surface form deviation of the partial surfaces and reference faces is established relative to an associated intended surface, wherein a location of the partial surfaces and reference faces is established in each case in the common coordinate system from the respective surface form deviation. At least one tilt and at least one decentration are established from the location as a function of a form of the respective partial surface and reference face in the coordinate system.

11 Claims, 3 Drawing Sheets

(56) References Cited

U.S. PATENT DOCUMENTS

| | | | |
|---|---|---|---|
| 7,760,365 B2* | 7/2010 | Ueki | G01M 11/0221 356/515 |
| 7,792,366 B1* | 9/2010 | Ge | G01B 11/272 356/124 |
| 8,379,222 B2* | 2/2013 | Hagino | G01B 11/2441 356/512 |
| 2003/0214646 A1* | 11/2003 | Ito | G01M 11/0221 356/124 |
| 2005/0174566 A1 | 8/2005 | Namiki | |
| 2006/0209294 A1 | 9/2006 | Murata | |
| 2009/0323081 A1* | 12/2009 | Hirano | G01B 5/0004 356/601 |
| 2010/0231923 A1 | 9/2010 | Ge et al. | |
| 2011/0075887 A1* | 3/2011 | Tanaka | G01M 11/0221 382/106 |
| 2012/0133951 A1* | 5/2012 | Heinisch | G01B 11/14 356/498 |
| 2013/0027692 A1* | 1/2013 | Ogura | G01M 11/0221 356/127 |

FOREIGN PATENT DOCUMENTS

| | | |
|---|---|---|
| DE | 10 2008 018 143 A1 | 10/2009 |
| EP | 2 228 623 A1 | 9/2010 |
| EP | 2369319 A2 * | 9/2011 |
| FR | 2 838 512 A1 | 10/2003 |
| JP | 5334227 B2 | 11/2013 |

* cited by examiner

| 1 | Optical Element | 2.2 | Measurement unit | 2.1.2 | Optical registration unit |
|---|---|---|---|---|---|
| 1.1 | Partial surface | 2.3 | Elevation unit | 2.1.3 | Projection unit |
| 1.2 | Partial surface | 2.4 | Control unit | 2.2.1 | Optical registration unit |
| 1.3 | Partial surface | 2.5 | Receptacle unit | 2.2.2 | Optical registration unit |
| 2.1 | Measurement Unit | 2.1.1 | Optical registration unit | 2.2.3 | Projection unit |

METHOD AND DEVICE FOR MEASURING A DECENTRATION AND TILT OF FACES OF AN OPTICAL ELEMENT

This nonprovisional application claims priority under 35 U.S.C. §119(a) to German Patent Application No. 10 2014 208 636.1, which was filed in Germany on May 8, 2014, and which is herein incorporated by reference.

BACKGROUND OF THE INVENTION

Field of the Invention

The present invention relates to a method for measuring a decentration and tilt of faces of an optical element and to a device for measuring a decentration and tilt of faces of an optical element.

Description of the Background Art

Position errors of optical axes of faces of an optical element generally cause aberrations, which may lead to malfunctions in an application of the element in an optical system. Such aberrations are not correctable, or often only correctable with much outlay. For these reasons, it is necessary, for example within the scope of quality control after production of the optical element, to register such position errors.

DE 10 2006 052 047 A1 has disclosed a method for determining the location of an axis of symmetry of an aspherical lens face relative to a reference axis. The method comprises the following steps:
a) determining a location of a center of curvature of a spherical component of the lens face;
b) determining an inclination of a radial profile of the lens face in a region of the lens face lying within a measurement window;
c) twisting the lens face about an axis of rotation such that another region of the lens face enters the measurement window;
d) determining the inclination of a radial profile of the lens face in the different region of the lens face;
e) repeating steps c) and d) at least twice;
f) establishing the location of the axis of symmetry of the aspherical lens face relative to the axis of rotation from the measurement values determined in steps a) and d).

Furthermore, DE 10 2006 052 047 A1 describes a device for determining the location of the axis of symmetry of an aspherical lens face relative to the reference axis. The device comprises:
a) a rotary table which is rotatable about an axis of rotation and on which a lens carrying the aspherical lens face is arrangeable,
b) a first autocollimator, the optical axis of which is aligned coaxially with the axis of rotation and the image-side focal point of which is positionable at different longitudinal positions along the optical axis thereof,
c) a second autocollimator, the optical axis of which includes an angle with the axis of rotation that differs from zero and the image-side focal point of which is positionable at different longitudinal positions along the optical axis thereof, and
d) an evaluation apparatus, which establishes the location of the axis of symmetry of the aspherical lens face relative to the axis of rotation from the measurement signals supplied by the autocollimators at different angles of rotation of the rotary table.

SUMMARY OF THE INVENTION

It is therefore an object of the present invention to provide a method and a device for measuring a decentration and tilt of faces of an optical element.

In an embodiment, the method for measuring a decentration and tilt of faces of an optical element, at least all optically used and frame-relevant partial surfaces of a surface of the optical element and reference faces of the optical element are registered over the whole area thereof and referenced to one another in a common coordinate system. Here, a frame-relevant partial surface is understood to be a partial surface of the optical element which, in a later use, is formed to make an arrangement of the optical element in a frame. Furthermore, in each case a surface form deviation of the partial surfaces and reference faces is established relative to an associated intended surface, wherein a location of the partial surfaces and reference faces is established in each case in the common coordinate system from the respective surface form deviation. At least one tilt and at least one decentration are established from the location as a function of a form of the respective partial surface and reference face in the coordinate system.

In an embodiment, the method according to the invention enables a very accurate, easily performable and particularly fast establishment of the decentration and tilt of faces of optical elements. This emerges from, in particular, the fact that, as a result of the whole-area registration of the partial surfaces and reference faces and the establishment of the surface form deviation of at least the partial surfaces and reference faces from an "ideal" intended surface, surface form deviations can be taken into account when establishing the decentration and tilt and therefore these are not included erroneously in the result. Additionally, as a result of the whole-area registration of the surface of the front side and rear side and the referencing of these in the common coordinate system, the method is suitable for establishing tilts and decentrations of optical elements with arbitrary forms and surfaces, in particular optical lenses with spherical, aspherical, bispherical, biaspherical and ellipsoid surfaces and optical lenses with free-form faces.

As a result of the fact that all measurements can be carried out in one work step in a common device in the common coordinate system, it is possible to dispense with time-consuming and expensive calibrations and adjustments of the device and the optical element therein, which calibrations and adjustments result from converting and repositioning the optical element into other devices.

Hence, tilts and decentrations of the faces of the optical elements can be established easily, very accurately and reproducibly, as a result of which a very accurate and reliable specification of physical properties of the optical elements can be ensured.

In an embodiment, at least one defined pattern can be projected onto the partial surfaces and reference faces of the optical element for registering same. The partial surfaces, reference faces and the at least one projected pattern are registered optically and the shaping of the partial surfaces and reference faces is established on the basis of a deviation of the at least one defined pattern from an intended pattern which results from a shaping of the partial surfaces and reference faces. This embodiment firstly renders it possible to carry out the registration and measurement of the partial surfaces and reference faces of the optical element in a contactless manner and, secondly, it is distinguished by a high measurement accuracy and a very quick performability.

In an embodiment, the registration of all partial surfaces and reference faces can be carried out simultaneously. Hence, time-consuming work steps of repositioning the optical element within the device can be dispensed with.

In an embodiment of the method, at least one distance measurement sensor can be moved linearly along a movement axis over the partial surfaces and reference faces so as to register the partial surfaces and reference faces of the optical element and a distance is established between the corresponding partial surface or reference face and the distance measurement sensor, wherein the optical element is simultaneously rotated about an axis of rotation extending substantially perpendicular to the movement axis of the distance measurement sensor in such a way that a spiral whole-area scan of the corresponding partial surface and reference face is carried out. Here, the movement axis and the axis of rotation in particular span an area, in which an optical axis of the optical unit lies. Consequently, a very accurate and, at the same, time simply performable whole-area measurement of the partial surfaces and reference faces is possible.

In order to further increase the accuracy of the measurement and for adapting it to different surface forms of the optical elements to be examined, the at least one distance measurement sensor can be aligned such that, at each measuring point, the optical axis of said sensor extends perpendicular to the reference face and partial surface respectively.

The device according to the invention for measuring a decentration and tilt of faces of an optical element comprises at least one measurement unit for registering at least all optically used and frame-relevant partial surfaces of a surface of the optical element and reference faces of the optical element, at least one evaluation unit for referencing the partial surfaces and reference faces in a common coordinate system, for comparing the registered partial surfaces and reference faces with a respectively associated intended surface and for establishing a surface form deviation of the partial surfaces and reference faces relative to the associated intended surface. Here, a location of the partial surfaces and reference faces in the common coordinate system is respectively establishable from the respective surface form deviation and at least one tilt and at least one decentration are establishable from this location as a function of a form of the respective partial surface and reference face in the common coordinate system.

The device according to an embodiment of the invention enables a very exact and easily performable establishment of the decentration and tilt of the faces of optical elements, which, in particular, emerges from the fact that, as a result of the whole-area registration of the partial surfaces and reference faces and the establishment of the surface form deviation of the partial surfaces and reference faces from an ideal intended surface, surface form deviations can be taken into account when establishing the decentration and tilt and therefore these are not included erroneously in the result. Additionally, the device is suitable for establishing tilts and decentrations of optical elements with arbitrary forms and surfaces, in particular optical lenses with spherical, aspherical, bispherical, biaspherical and ellipsoid surfaces and optical lenses with free-form faces.

As a result of the fact that all measurements can be carried out together in one work step in the device in the common coordinate system, it is possible to dispense with time-consuming and expensive calibrations and adjustments of the device and the optical element therein, which calibrations and adjustments result from converting and repositioning the optical element into other devices.

In an exemplary embodiment of the device, the measurement unit comprises at least one projection unit for projecting at least one defined pattern onto the partial surfaces and reference faces, at least one optical registration unit for registering the partial surfaces and reference faces and the at least one pattern, and an evaluation unit for establishing a shaping of the partial surfaces and reference faces from a deviation of the at least one defined pattern from an intended pattern resulting from the shaping of the partial surfaces and reference faces. This embodiment enables a contactless registration and measurement of the partial surfaces and reference faces with, at the same time, a high measurement accuracy and measurement speed.

In an embodiment, provision is made for a receptacle unit for receiving the optical element, wherein two measurement units are provided and in each case comprise at least one projection unit for projecting at least one defined pattern onto the partial surfaces and reference faces and in each case at least two optical registration units for registering the partial surfaces and reference faces and the at least one pattern. Here, an evaluation unit is provided for establishing a shaping of the partial surfaces and reference faces from a deviation of the at least one defined pattern from an intended pattern resulting from the shaping of the partial surfaces and reference faces. One of the projection units is arranged above the receptacle unit and one of the projection units is arranged below the receptacle unit. Furthermore, at least one of the optical registration units is arranged above the receptacle unit and at least one of the optical registration units is arranged below the receptacle unit, wherein the optical registration units can be embodied and arranged in such a way that the partial surfaces and reference faces are optically registrable at the same time. A particularly high measurement accuracy advantageously emerges from this in addition to particularly high measurement speed since the measurements can be carried out in only one work step without interposed rearrangements, calibrations and adjustments of the measurement unit and the optical element.

In an embodiment, a registration region of the at least two registration units intersects in portions. By evaluating the registered image data of the intersecting portions, it is possible, in a simple manner, to establish alignment errors of the registration units and to perform the calibration and adjustment.

In accordance with an embodiment, the at least one optical registration unit can be a stereo camera and the evaluation unit can be embodied for a stereoscopic evaluation of image data registered by the stereo camera. This embodiment enables a very robust three-dimensional registration and measurement of the partial surfaces and reference faces.

In order to enable a very accurate and at the same time easily performable whole-area measurement of the partial surfaces and reference faces, the registration unit, in an embodiment of the device, comprises at least one distance measurement sensor for registering the partial surfaces and reference faces of the optical element, wherein the distance measurement sensor is linearly movable along a movement axis over the partial surfaces and reference faces and it is provided for establishing a distance between the corresponding partial surface or the reference face and the distance measurement sensor.

In an embodiment, provision is made for a receptacle unit for receiving and holding the optical element, wherein at least one holding portion of the receptacle unit, provided for holding the optical element, is rotatable about an axis of rotation extending substantially perpendicular to the movement axis of the at least one distance measurement sensor. The receptacle unit enables a secure hold of the optical element, wherein the latter merely needs to be positioned once in the holder for carrying out the whole method. As a result of this, complicated converting and calibration and adjustment of the device and the optical unit are dispensed with.

In accordance with an embodiment, the distance measurement sensor is a light wave-based interferometer. By means of such a light wave-based interferometer, which, in particular, operates with a multiplicity of wavelengths, the surfaces of the optical element are registrable in a contactless and very exact manner.

In order to obtain a particularly high accuracy of the measurement and simple adaptation of same to different surface forms of the optical elements to be examined, the at least one distance measurement sensor can be arranged on a holding and movement device in such a variably positionable manner that an optical axis of the distance measurement sensor extends substantially perpendicular to the surface of the front side or the surface of the rear side at each measurement point.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
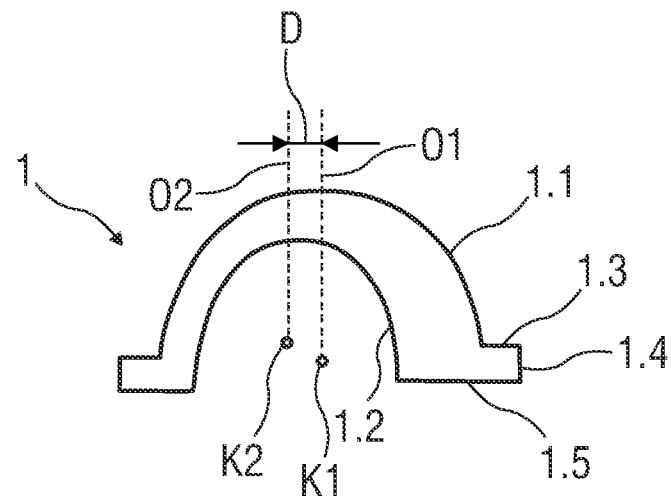
FIG. 1 schematically shows an optical element with a decentration.

FIG. 1 depicts an optical element 1, embodied as an optical lens, with a first optically used partial surface 1.1 embodied as a spherical face, a second optically used partial surface 1.2 embodied as an aspherical face, and three frame-relevant partial surfaces 1.3 to 1.5. Here, a frame-relevant partial surface 1.3 to 1.5 is understood to mean a partial surface 1.3 to 1.5 of the optical element 1 which, during a later use of the optical element 1, is embodied for arranging same in a frame (not depicted here).

In the depicted embodiment of the optical element 1, optical axes O1, O2, which extend through a respective center of curvature K1, K2 of the partial surface 1.1 and partial surface 1.2, are arranged in a manner displaced in parallel from one another. Hence, a so-called decentration is generated between the partial surfaces 1.1, 1.2.

Figure 2:
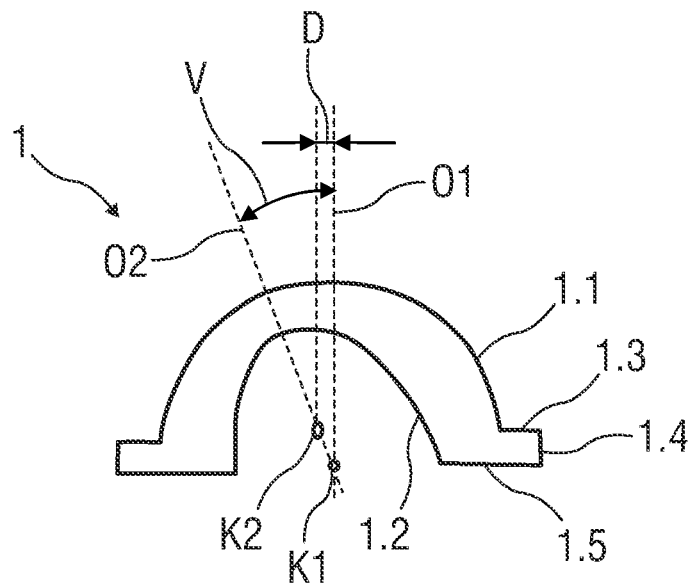
FIG. 2 schematically shows an optical element with a decentration and a tilt.

FIG. 2 likewise shows an optical element 1, embodied as an optical lens, with an optically used first partial surface 1.1 embodied as a spherical face and an optically used second partial surface 1.2 embodied as an aspherical face, and also three frame-relevant partial surfaces 1.3 to 1.5. Here, the optical axes O1, O2 of the partial surfaces 1.1, 1.2 are likewise arranged displaced from one another such that a decentration D is generated between the first and second partial surfaces 1.1, 1.2. Moreover, an angle greater than zero is formed between the optical axes O1, O2 of the first and second partial surfaces 1.1, 1.2 such that, additionally, a so-called tilt V is formed between the partial surfaces 1.1, 1.2.

In general, the position errors, depicted in FIGS. 1 and 2, of the optical axes O1, O2 or the axes of symmetry of the partial surfaces 1.1, 1.2 cause aberrations which may lead to malfunctions when the element 1 is used in an optical system. Such aberrations are not correctable, or often only correctable with much outlay.

For these reasons, it is necessary, for example within the scope of quality control after the production of the optical element 1, to be able to very precisely determine a location of the optical axes O1, O2 of the partial surfaces 1.1, 1.2 relative to a reference axis.

Figure 3:
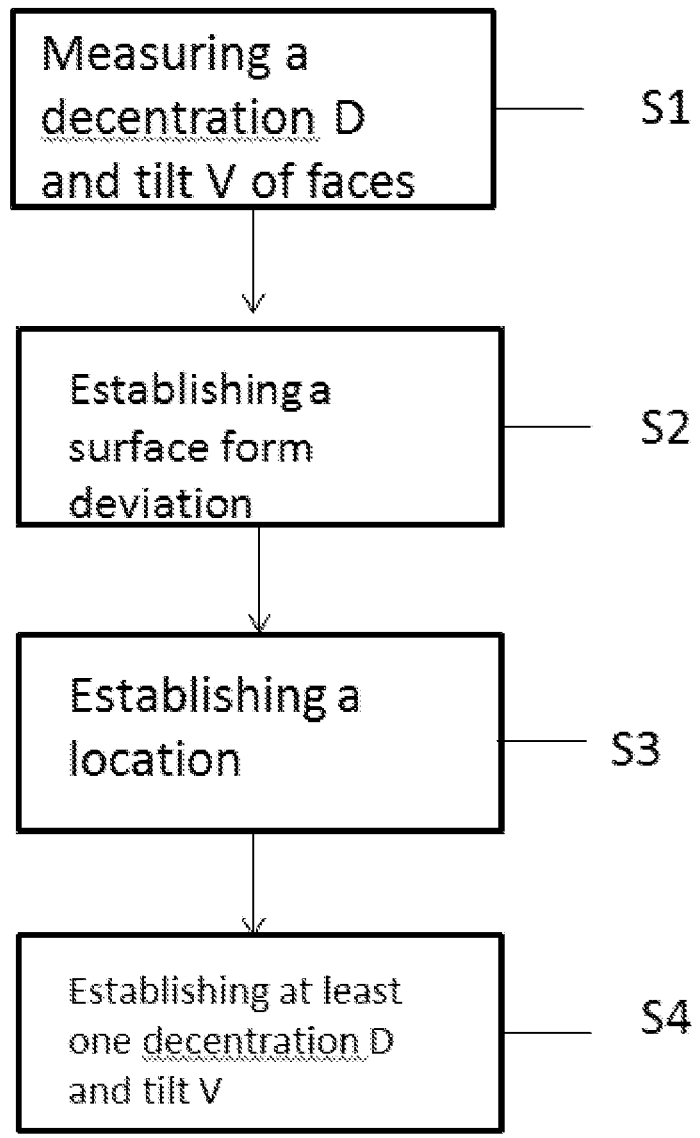
FIG. 3 schematically shows a progress of a method according to the invention, and FIG. 4 schematically shows a device according to the invention.

FIG. 3 depicts a progress of a possible exemplary embodiment of the method according to the invention, by means of which a determination with such great precision is performable.

Here, all optically used and frame-relevant partial surfaces 1.1 to 1.5 of a surface of the optical element 1 and all reference faces (not depicted here) of the optical element are registered over the whole area thereof and referenced to one another in a common coordinate system in a first method step S1 for the purposes of measuring a decentration D and tilt V of faces.

Subsequently, in a second method step S2, a surface form deviation of the partial surfaces 1.1 to 1.5 and of the reference faces (not shown) from a respectively associated intended surface is established in each case.

In accordance with a first exemplary embodiment of the method, the partial surfaces 1.1 to 1.5 and the reference faces (not shown here) are, for example, registered by means of a method described in "LUPHOScan—Fast non-contact 3D topology measurement of spheres, aspheres, flats and freeform; Luphos GmbH, Weberstraße 21, 55130 Mainz, Germany; 05/2013" and/or by means of a device described therein. Here, in particular, a spiral whole-area scan of the corresponding surface is carried out such that a three-dimensional image of same is registered. In order to realize this, at least one distance measurement sensor is moved linearly along a movement axis over the partial surfaces 1.1 to 1.5 and reference faces (in a manner not depicted in any more detail) for registering the partial surfaces 1.1 to 1.5 and reference faces of the optical element 1, and a distance between the corresponding partial surface 1.1 to 1.5 or reference face and the distance measurement sensor is established. At the same time, the optical element is rotated about an axis of rotation extending substantially perpendicular to the movement axis of the distance measurement sensor in such a way that the spiral whole-area scan of the corresponding partial surface 1.1 to 1.5 and of the reference face is performed. In the process, the distance measurement sensor is aligned in such a way that, at each measurement point, the optical axis thereof in each case extends perpendicular to the reference face and partial surface 1.5 to be measured. By way of example, the distance measurement sensor is a light wave-based interferometer.

Figure 4:
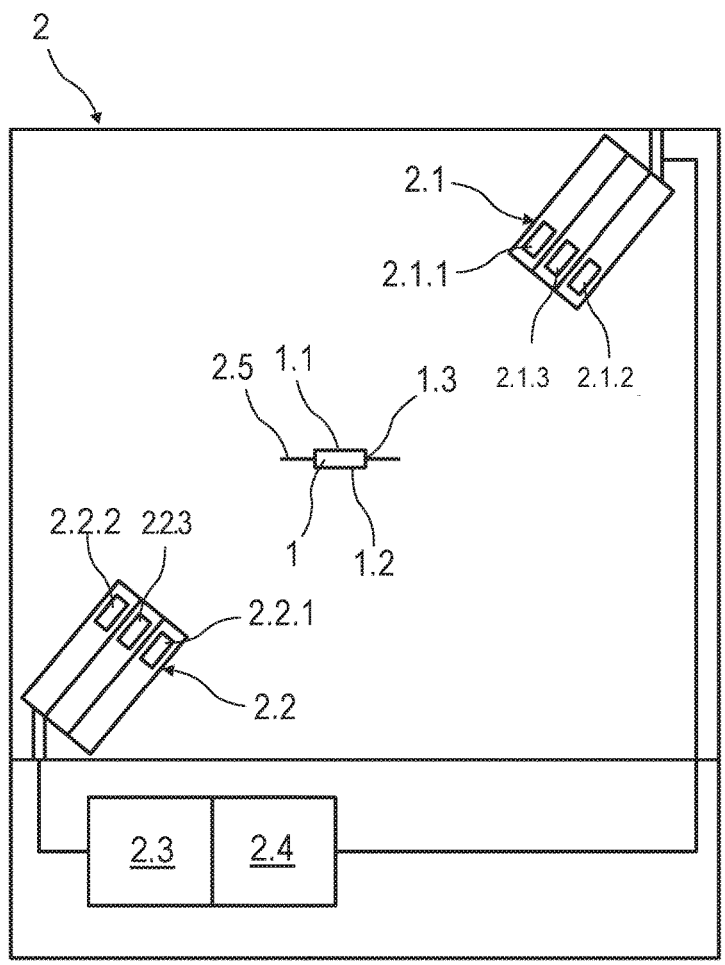

As an alternative to this registration of the partial surfaces 1.1 to 1.5 and the reference faces (not shown here), the registration in accordance with a second exemplary embodiment is implemented, for example, by means of a device 2 depicted in more detail in FIG. 4, by virtue of at least one defined pattern being projected onto the partial surfaces 1.1 to 1.5 and the reference faces (not depicted here) of the optical element 1. Here, the partial surfaces 1.1 to 1.5, reference faces and the at least one projected pattern are registered optically. The shaping of the partial surfaces 1.1 to 1.5 and reference faces is established on the basis of a deviation of the at least one defined pattern from an intended pattern, resulting from a shaping of the partial surfaces 1.1 to 1.5 and reference faces. Here, the registration and projection for all partial surfaces 1.1 to 1.5 and reference faces is implemented simultaneously.

Alternatively, it is also possible, in a third exemplary embodiment of the method, for the registration and projection to be carried out in a plurality of steps, for example initially for a top side and subsequently for a rear side of the optical element 1.

As an alternative to the described alternative embodiments of the exemplary embodiments of the method, a cumulative use of the exemplary embodiments is also possible, wherein this renders possible an improvement of an accuracy when establishing the surface deviations and a verifiability and plausibility check of the results of the respective exemplary embodiments.

Independently thereof, the result of this registration is, in particular, a so-called point cloud, which represents the partial surfaces 1.1 to 1.5 and the reference faces (not shown here). This point cloud is then compared to intended data stored for the respective optical element 1, wherein the surface deviation is established from a deviation of the values of the point cloud from the intended data, or from a difference between these.

After establishing the surface form deviation of the partial surfaces 1.1 to 1.5 and the reference faces (not shown here) from the respectively associated intended surface, a location of the partial surfaces 1.1 to 1.5 and reference faces is, in a third method step S3, established in each case in the common coordinate system from the respective surface form deviation.

Subsequently, in a fourth method step S4, there is an establishment of the at least one tilt V and at least one decentration D from the location of the partial surfaces 1.1 to 1.5 and reference faces as a function of a form of the respective partial surface 1.1 to 1.5 and reference face in the coordinate system. Here, a number of possible tilts V and decentrations D depends on the form of the respective partial surface 1.1 to 1.5 and the respective reference face. By way of example, an aspherical surface has one possible tilt V and decentration D. By contrast, a free-form face can have up to three possible tilts V and up to three possible decentrations D.

Here, in particular, the tilt V is initially established within the common coordinate system and the optical element 1 is fitted to the intended data in such a way that the at least one tilt V is minimized. In this position, the at least one decentration D of the optical element is subsequently established.

Subsequently, the at least one tilt V and decentration D can be corrected by a surface processing of the optical element 1, wherein the processing is preferably likewise implemented in the device 2 with reference to the common coordinate system in order to achieve a particularly high accuracy.

Alternatively or additionally, a check is carried out as to whether the optical element 1 is within a predetermined specification. The obtained information is used, in particular, to optimize the optical element 1 in respect of its subsequent location in an optical system in order to obtain the greatest possible performance.

FIG. 4 shows a possible exemplary embodiment of a device 2 according to the invention for measuring at least one decentration D and at least one tilt V of the partial surfaces 1.1 to 1.3 and reference faces of an optical element 1. Here, the optical element 1 is greatly simplified with two optically used partial surfaces 1.1, 1.2 and one frame-relevant partial surface 1.3. However, the device 2 is embodied for measuring decentrations D and tilts V of any optical element 1 with any number and arrangement of optically used and frame-relevant partial surfaces 1.1 to 1.5 and reference faces.

In the depicted exemplary embodiment, the device 2 comprises two measurement units 2.1, 2.2 for registering at least all optically used and frame-relevant partial surfaces 1.1 to 1.3 of the surface of the optical element 1 and reference faces (not shown here) of the optical element 1, wherein one measurement unit 2.1 in an top part of the device 2 is directed onto a top side of the optical element 1 and a further measurement unit 2.2 in a bottom part of the device 2 is directed onto a bottom side of the optical element 1.

Furthermore, the device 2 comprises an evaluation unit 2.3 for referencing the partial surfaces 1.1 to 1.3 and reference faces in a common coordinate system, for the purposes of comparing the registered partial surfaces 1.1 to 1.3 and reference faces to the respectively associated intended surface and for the purposes of establishing a surface form deviation of the partial surfaces 1.1 to 1.3 and reference faces from the associated intended surface.

Furthermore, the device 2 comprises a control unit 2.4, with the evaluation unit 2.3 and the control unit 2.4 forming a structural unit in the depicted exemplary embodiment. Alternatively, a separate embodiment is also possible.

The optical element 1 is held within the device 2 by means of a receptacle unit 2.5, wherein the receptacle unit 2.5 comprises an appropriate fastener to securely fastening the optical element 1 and it is embodied in such a way that the optical element 1 is simultaneously registrable as completely as possible from all sides by means of the measurement units 2.1, 2.2. Here, the receptacle unit 2.5 is aligned in a defined manner in respect of the coordinate system.

The measurement units 2.1, 2.2 in each case comprise two optical registration units 2.1.1, 2.1.2, 2.2.1, 2.2.2, embodied as so-called CCD cameras, for registering the partial surfaces 1.1 to 1.3 and reference faces. Here, in one possible embodiment, the optical registration units 2.1.1, 2.1.2, 2.2.1, 2.2.2 are embodied and arranged in such a way that the registration regions thereof at least partly intersect. In a further possible embodiment, the measurement units 2.1, 2.2 are arranged in a movable manner, with a respective movement being controlled by means of the control unit 2.4.

Furthermore, the measurement units 2.1, 2.2 respectively comprise a projection unit 2.1.3, 2.2.3, by means of which at least one defined pattern is projected onto the partial surfaces 1.1 to 1.3 and reference faces. In particular, the measurement units 2.1, 2.2 are embodied in accordance with DE 196 37 682 A1 and are suitable for a self-calibrating structured-light projection.

To this end, defined patterns, e.g. strip patterns, are projected onto the partial surfaces 1.1 to 1.3 and reference faces of the optical element 1 to be measured from in each case two different directions by means of the projection unit 2.1.3, 2.2.3 for the top and bottom side of the optical element 1, which patterns are registered by means of the registration units 2.1.1, 2.1.2, 2.2.1, 2.2.2. In particular, two grating sequences, which are twisted by 90° with respect to one another, are projected in succession onto the partial surfaces 1.1 to 1.3 and reference faces as a pattern from in each case two different directions.

Here, in particular as described in DE 196 37 682 A1, which is incorporated herein by reference, the measurement is implemented by means of mathematical algorithms, wherein at least four phase measurement values are determined for each measurement point from the registered images of the partial surfaces 1.1 to 1.3 and reference faces and coordinates of the corresponding measurement point and geometry and imaging properties of the measurement units 2.1, 2.2 are determined from the phase measurement values. To this end, an intensity of the strips of the pattern is registered by means of the high resolution registration units 2.1.1, 2.1.2, 2.2.1, 2.2.2, which are, in particular, respectively embodied as a CCD camera, and two mutually independent absolute phase measurement values per measurement point of the registration units 2.1.1, 2.1.2, 2.2.1, 2.2.2 are established per direction by using known phase evaluation methods. Subsequently, a phase correlation of the data of the respectively two registration units 2.1.1, 2.1.2, 2.2.1, 2.2.2 of the measurement units 2.1, 2.2 is implemented for each individual direction, which, as a result, establishes corresponding pixels in the respective two registration units 2.1.1, 2.1.2, 2.2.1, 2.2.2. For these, using the method of self calibration in accordance with DE 196 37 682 A1, system parameters and three-dimensional coordinate values on the optical element 1 to be measured are calculated simultaneously.

A shaping of the partial surfaces 1.1 to 1.3 and reference faces is established from the registered profiles of the patterns by means of the evaluation unit 2.3 and a deviation of the shaping of the partial surfaces 1.1 to 1.5 and reference faces is subsequently established from a resulting deviation of the patterns from an intended pattern.

As described, a location of the partial surfaces 1.1 to 1.3 and reference faces is respectively established in the common coordinate system from the deviation of the shaping of the partial surfaces 1.1 to 1.3 and reference faces from an intended value, i.e. from the surface form deviation, and at least one tilt V and at least one decentration D are established as a function of the form of the respective partial surface 1.1 to 1.3 and reference face in the coordinate system from the location.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for measuring a decentration and a tilt of faces of an optical element, the method comprising:
    registering at least all optically used partial surfaces and frame-relevant partial surfaces of a surface of the optical element and reference faces of the optical element over a whole area of the optical element and referenced to one another in a common coordinate system;
    establishing, in each case, a surface form deviation of the partial surfaces and reference faces relative to an associated intended surface stored for the optical element;
    establishing a location of the partial surfaces and the reference faces in the common coordinate system from the respective surface form deviation; and
    determining at least one tilt and at least one decentration from the location as a function of a form of the respective partial surface and reference face in the common coordinate system.

2. The method as claimed in claim 1, wherein at least one defined pattern is projected onto the partial surfaces and the reference faces of the optical element for registering the at least one defined pattern,
    wherein the partial surfaces, reference faces and the at least one projected pattern are registered optically, and
    wherein the shaping of the partial surfaces and the reference faces is established based on a deviation of the at least one defined pattern from an intended pattern which results from a shaping of the partial surfaces and the reference faces.

3. The method as claimed in claim 2, wherein the registration of all partial surfaces and reference faces is carried out simultaneously.

4. The method as claimed in claim 1, wherein at least one distance measurement sensor is moved linearly along a movement axis over the partial surfaces and the reference faces so as to register the partial surfaces and the reference faces of the optical element and a distance is determined between the corresponding partial surface or reference face and the distance measurement sensor,
    wherein the optical element is substantially simultaneously rotated about an axis of rotation extending substantially perpendicular to the movement axis of the distance measurement sensor in such a way that a spiral whole-area scan of the corresponding partial surface and reference face is carried out.

5. The method as claimed in claim 4, wherein the at least one distance measurement sensor is aligned such that, at each measuring point, the optical axis of said sensor respectively extends substantially perpendicular to the reference face and partial surface to be measured.

6. A device for measuring a decentration and tilt of faces of an optical element, the device comprising:
    at least one measurement unit for registering at least all optically used and frame-relevant partial surfaces of a surface of the optical element and reference faces of the optical element; and
    at least one evaluation unit for referencing the partial surfaces and reference faces in a common coordinate system for comparing the registered partial surfaces and reference faces with a respectively associated intended surface and for establishing a surface form deviation of the partial surfaces and reference faces, in each case relative to the associated intended surface stored for the optical element,
    wherein a location of the partial surfaces and reference faces in the common coordinate system is respectively establishable from a respective surface form deviation, and
    wherein at least one tilt and at least one decentration are establishable from the location as a function of a form of the respective partial surface and reference face in the common coordinate system.

7. The device as claimed in claim 6, further comprising:
    at least one projection unit projecting at least one defined pattern onto the partial surfaces and reference faces;
    at least one optical registration unit registering the partial surfaces and reference faces and the at least one pattern; and
    an evaluation unit establishing a shaping of the partial surfaces and reference faces from a deviation of the at least one defined pattern from an intended pattern resulting from the shaping of the partial surfaces and reference faces.

8. The device as claimed in claim 6, wherein provision is made for a receptacle unit for receiving the optical element, wherein two measurement units are provided and in each case comprise at least one projection unit projecting at least one defined pattern onto the partial surfaces and reference faces and at least two optical registration units registering the partial surfaces and reference faces and the at least one pattern, wherein an evaluation unit establishes a shaping of the partial surfaces and reference faces from a deviation of the at least one defined pattern from an intended pattern resulting from the shaping of the partial surfaces and reference faces, wherein one of the projection units is arranged above the receptacle unit and one of the projection units is arranged below the receptacle unit and at least one of the optical registration units is arranged above the receptacle unit and at least one of the optical registration units is arranged below the receptacle unit, and wherein the optical registration units are arranged such that the partial surfaces and reference faces are optically registrable at the same time.

9. The device as claimed in claim 7, wherein the at least one optical registration unit is a stereo camera, and wherein the evaluation unit is configured for a stereoscopic evaluation of image data registered by the stereo camera.

10. The device as claimed in claim 6, wherein the measurement unit comprises at least one distance measurement sensor for registering the partial surfaces and reference faces of the optical element, and wherein the distance measurement sensor is linearly movable over the partial surfaces and reference faces along a movement axis and establishes a distance between the corresponding partial surface or reference face and the distance measurement sensor.

11. The device as claimed in claim 10, wherein the distance measurement sensor is a light wave-based interferometer.

* * * * *